July 10, 1956 G. F. QUAYLE 2,753,946
CASTER WHEEL MOUNTING FOR CORNER DRIVE TRUCK
Filed May 27, 1953 4 Sheets-Sheet 1
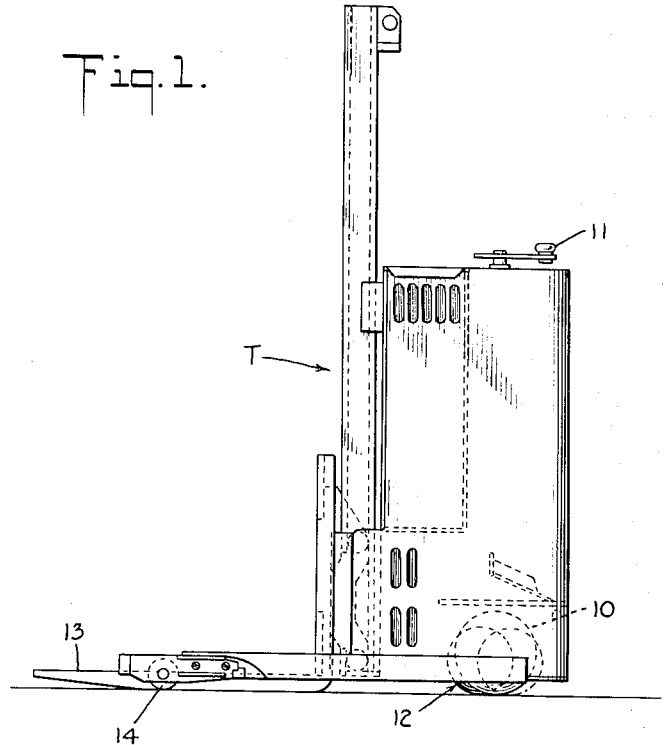
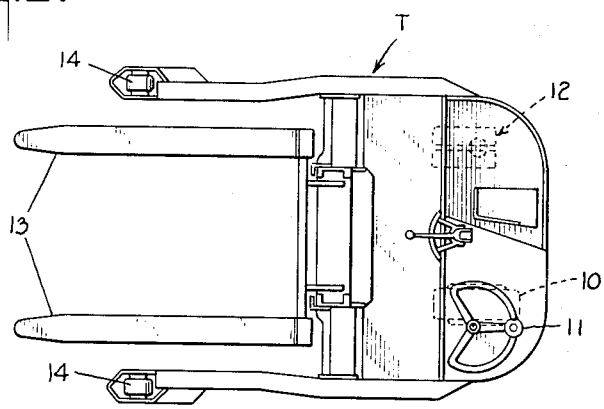
INVENTOR
George F. Quayle
BY
A. H. Golden
ATTORNEY

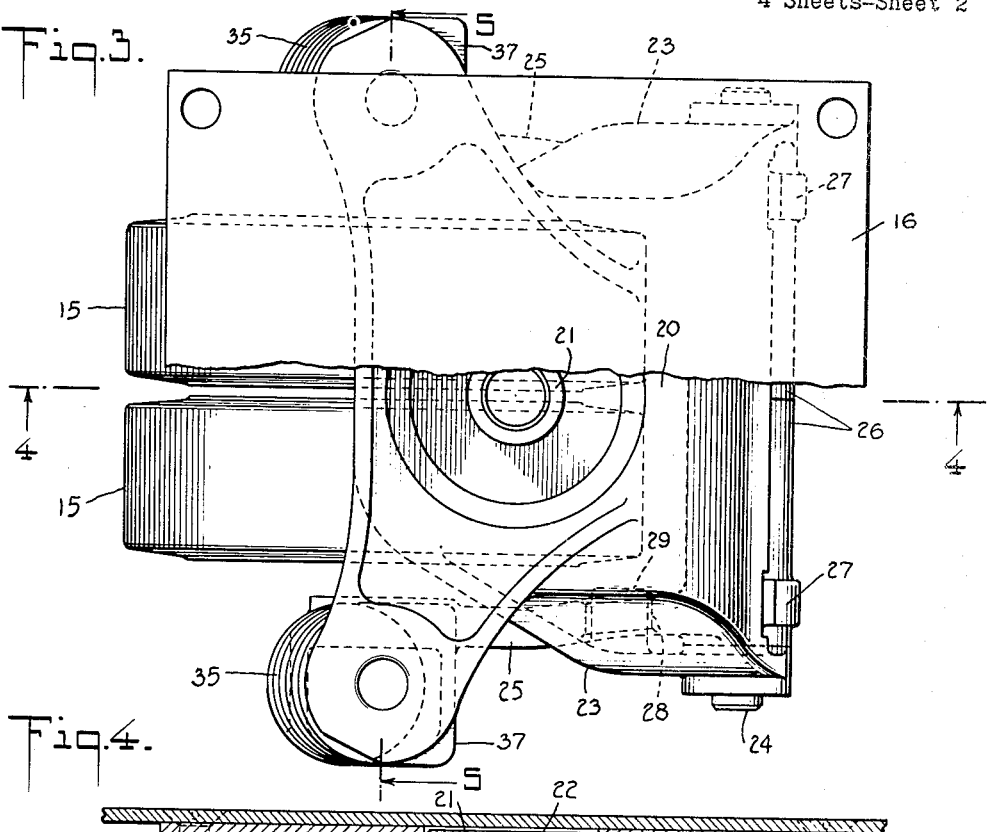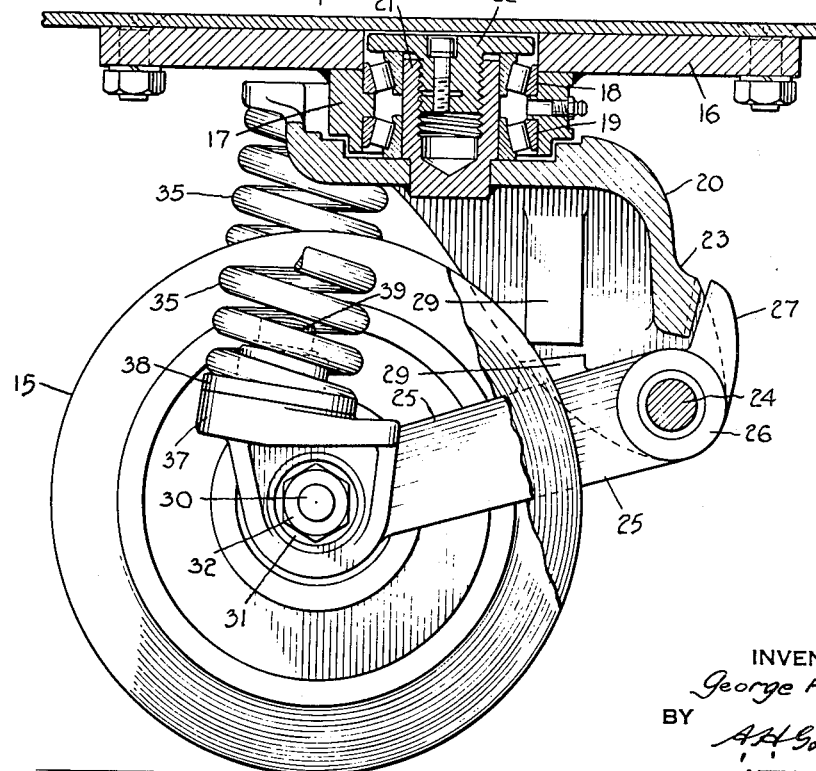

July 10, 1956  G. F. QUAYLE  2,753,946
CASTER WHEEL MOUNTING FOR CORNER DRIVE TRUCK
Filed May 27, 1953  4 Sheets-Sheet 3
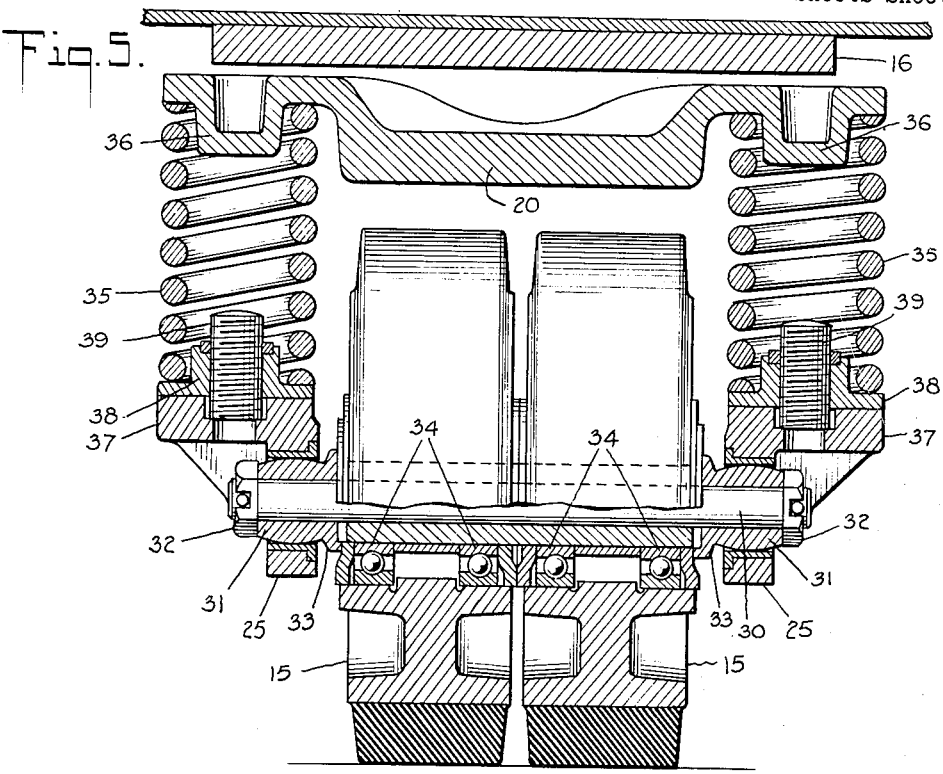
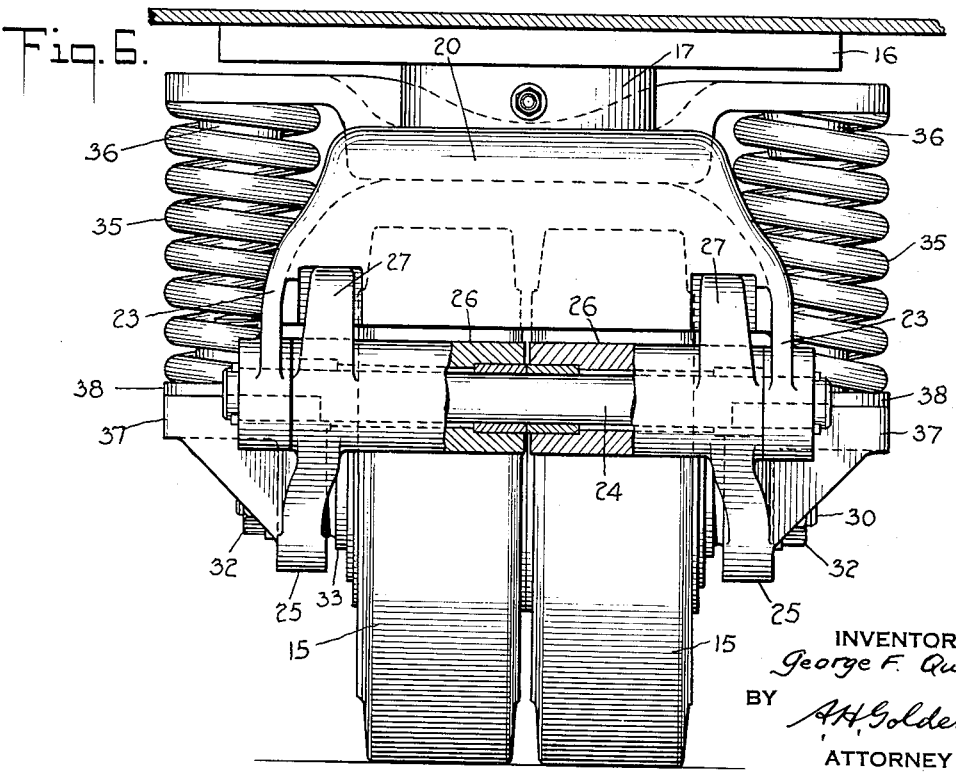
INVENTOR
George F. Quayle
BY A. H. Golden
ATTORNEY July 10, 1956 G. F. QUAYLE 2,753,946
CASTER WHEEL MOUNTING FOR CORNER DRIVE TRUCK
Filed May 27, 1953

INVENTOR
George F. Quayle
BY
A. H. Golden
ATTORNEY

United States Patent Office 2,753,946
Patented July 10, 1956

2,753,946

CASTER WHEEL MOUNTING FOR CORNER DRIVE TRUCK

George F. Quayle, Philadelphia, Pa., assignor to The Yale & Towne Manufacturing Company, Stamford, Conn., a corporation of Connecticut Application May 27, 1953, Serial No. 357,757

4 Claims. (Cl. 180—21)

This invention relates to industrial trucks, and more particularly to a novel caster wheel construction for a power operated industrial truck that facilitates the castering action of the wheel whereby to reduce the resistance that is offered by this wheel to the powered movement of the truck.

Those skilled in the art will appreciate that a caster wheel is steered through the movement bodily of the caster pivot, the wheel carried by the pivot then moving into proper trailing alignment with the caster pivot. If the caster pivot changes direction sharply, then the caster wheel has considerable shearing movement relatively to the ground surface. If the change in direction is gradual, the shearing movement is very slight and of no consequence, but, in industrial trucks, the changes in steering movement are often very sharp, and the friction due to the shearing action then interferes with castering action of the wheel.

Also, because of the rather heavy loads imposed on industrial trucks, the problem that arises from frictional resistance to castering action is emphasized. This is particularly true when the movement of the truck is directly reversed, because the caster wheel must then rotate 180° on the castering pivot in order to assume its normal trailing relation to the pivot. In fact, when the truck is directly reversed, or merely steered at a sharp angle, the frictional resistance to castering movement of the wheel may be so great as to stall the truck. It is obvious, therefore, that the usual caster construction places a certain limitation on the utility on the truck.

Through the extremely novel construction that I provide by my invention, I very materially reduce the resistance that is contributed by the caster wheel to movement of the truck, and I thereby enable the truck to move easily when steered in any direction, or even when directly reversed in the same line of travel. More particularly, as an important feature of my invention, the caster wheel automatically reduces its area of contact with the ground when the truck changes its direction of movement. This I accomplish by mounting the caster wheel for leaning movement under the influence of the transverse movement of the caster pivot when the wheel is steered. In other words, when the caster pivot is moved transversely by a change in the direction of truck movement, as may be effected through another wheel that acts positively to steer the truck, the same frictional engagement with the ground that opposes steering movement of the caster wheel causes this caster wheel to lean. The effect of friction between the caster wheel and the ground is thereby automatically reduced, and the caster wheel can very easily turn on its steering pivot to run it in the same direction as the positively steered wheel.

As a more detailed feature of my invention, I arrange the caster wheel to rotate on an axis that can tilt relatively to the vertical steering pivot of the wheel. Preferably, the caster wheel has an axle that is mounted upon parts positioned at opposed sides of the caster wheel, with these parts moving vertically relatively to one another as the axle tilts. To enable the caster wheel to support the truck, springs press the axle mounting parts downwardly, and the wheel leans through yielding of the springs incidental to castering action of the wheel.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a side view showing an industrial truck that embodies my novel caster construction.

Fig. 2 is a plan view of the truck shown in Fig. 1.

Fig. 3 is a plan view of my novel caster construction.

Fig. 4 is a view partly in section along line 4—4 of Fig. 3.

Fig. 5 is a cross sectional view generally along line 5—5 of Fig. 3 showing particularly the mounting of the caster wheels and their axle.

Fig. 6 is a front elevation of my construction, partially broken away to show the mounting of the wheel links.

Figure 7:
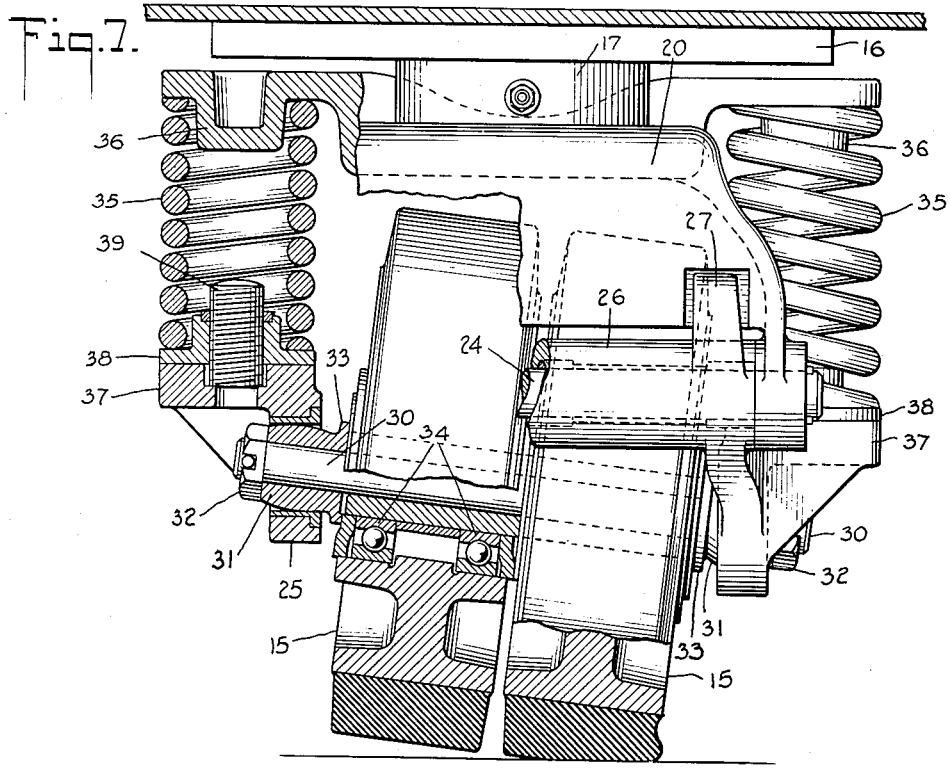
Fig. 7 is a view of the parts shown in Fig. 6, but illustrating the leaning action of the caster wheels.

In order that my invention may be fully appreciated, I show in Figs. 1 and 2 of the drawings an industrial truck T of that class in which my novel caster is utilized to particular advantage. Trucks of this class are steered on wheels at one end of the truck, with the steering action contributed solely through one of these wheels, generally a powered traction wheel. The other wheel is usually a caster wheel that is steered by the movement of the truck. Thus, the truck T that I illustrate has at one of its rear corners a combined steering and traction wheel 10 steered by a handle 11, and a caster, indicated generally by the numeral 12, at the opposed rear corner. The truck T has at its front end a load carrier that I show as a pair of lifting forks 13, this end of the truck being supported on a pair of non-steering wheels 14.

In this arrangement, the steering and traction or driving wheel 10, and caster wheel 12, act together to support and stabilize the rear end of the truck T. Further, both wheels can be steered through a very large angle, because the steering and traction wheel 10 is freely rotatable in its steering axis. Those skilled in the art will understand that by this construction the truck T has a high degree of maneuverability, and can make sharp turns in a restricted space to bring the forks 13 into position for lifting or depositing a load, while remaining completely stabilized upon its wheels at all times.

The particular details of the truck T are not important to an understanding of my invention. It is nevertheless important to realize that the caster 12 is steered through movement of the caster pivot when the driving and steering wheel 10 changes the direction of movement of the truck, the pressure of the ground then acting in a transverse direction upon the caster to rotate the caster wheel on the caster axis. In fact, when the driving action of the wheel 10 is directly reversed, the caster 12 turns through 180° in order to assume its normal trailing relation to the pivot. It is this lateral turning movement that, in the prior art, is resisted by frictional contact between the caster wheel and the ground, thereby interfering very considerably with the movement of the truck.

Through the extremely novel construction that I contribute by my invention, I reduce the friction of the caster 12 with the ground. In the preferred form of my invention, I utilize dual caster wheels 15, although the particular number of caster wheels is not important to a disclosure of my invention. As a means for mounting the caster wheels 15 for castering movement, I show a plate 16 that is secured to the main frame of the truck T, as best seen in Fig. 4. On the lower side of the plate 16 is welded a sleeve 17 in which I mount suitable roller bearings 18, 19. Below the plate 16 is a caster base 20 having a vertical stud 21 that rotates in the bearings 18, 19, and that is retained relatively thereto by a flanged screw plug 22.

Figure 8:
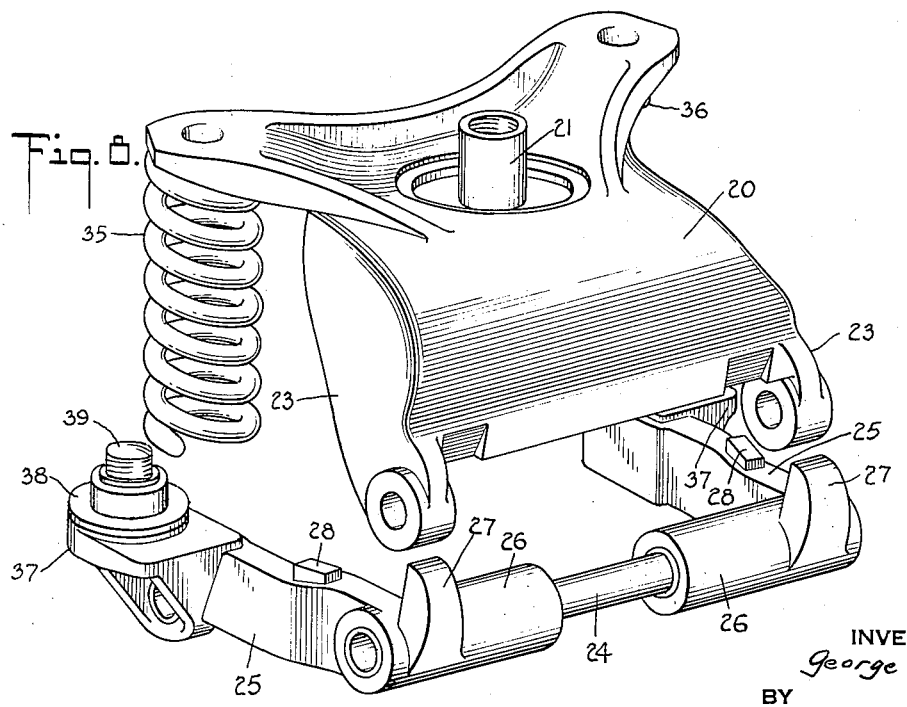
Fig. 8 is a view showing the wheel supporting links, springs and caster base in exploded relation.

The caster base 20 has downwardly extending side portions 23, best seen in Figs. 3, 6 and 8, that carry a transverse shaft 24 in forwardly offset relation to the vertical axis. Extending rearwardly from the transverse shaft 24 is a pair of wheel supporting links 25, these links having transverse sleeve portions 26, shown clearly in Figs. 6 and 8, whereby the links are mounted upon the shaft 24 to move upwardly and downwardly independently of one another relatively to the caster base 20. To prevent excessive upward and downward movement of the links 25, I prefer to form on each link a lug 27, shown in Fig. 4, to limit the downward movement of the link, and also an abutment 28 on each link to limit upward movement of the link by engagement with a shoulder 29 on the caster base 20.

The opposed ends of the links 25 are positioned in rearwardly offset relation to the caster axis, or in other words, at the opposed side of this axis relatively to the transverse pivot shaft 24, and on these rear ends of the links I mount the opposed ends of an axle 30 for the wheels 15, as is well illustrated in Fig. 5. It is possible for the axle 30 to tilt on its mounting relatively to the links 25 when the links move relatively to one another, and for the particular purpose I prefer to utilize bushings 31 that are held on the opposed ends of the axle 30 by nuts 32, these bushings 31 having rounded bearing surfaces engaging in openings in the links 25. Through these bearing surfaces on bushings 31, each end of axle 30 pivots on its corresponding link 25 as the axle tilts, with each axle end having a certain upward and downward movement that is independent of the other axle end. At the inner ends of the bushings 31 are flanges 33 that are adapted to engage the links 25 to prevent the axle 30 from moving endwise out of assembled relation to the links. I further utilize bearing means on which the caster wheels 15 will rotate relatively to the axle 30, and for this purpose I prefer to equip the axle with ball bearings 34 that may very well be held in position by the bushings 31.

Between the caster base 20 and the wheel supporting links 25 I mount individual coil springs 35 whereby the caster wheels 15 are pressed against the ground. As a preferred arrangement for mounting these springs, I form extensions on the caster base 20 having downwardly depending lugs 36, as may be very clearly seen in Figs. 5, 7 and 8, and upon the rear ends of the wheels supporting links 25 I show laterally projecting parts 37. Parts 37 carry seating members 38 that can be adjusted by screws 39 to vary the action of the springs 35, the springs bearing between the caster base 20 and wheel supporting links 25, and being retained by lugs 36 and seating members 38.

The springs 35 normally act to hold the caster wheels 15 in firm contact with the ground and, by yielding when the truck passes over uneven ground, they enable the steering and driving wheel 10 to maintain uniform tractive engagement with the ground. It is extremely important to observe, however, that in my invention the springs 35 can yield independently through movement of the wheel supporting links 25 relatively to one another, with the axle 30 then tilting in the manner shown in Fig. 7. Thereby the bearing means 34 on which the caster wheels 15 rotate will tilt, and the wheels themselves will lean. This action occurs automatically when the direction of movement of the truck is changed by the steering and driving wheel 10, as will be understood when it is remembered that the caster wheels 15 are steered through movement of the caster axis with the pressure of the ground acting in a transverse direction upon the caster wheels 15.

More particularly, the transverse steering movement of the vertical caster axis is resisted by the friction of the caster wheels 15 relatively to the ground, and this resistance causes the wheels 15 to lean. The wheels 15 thereby reduce their area of tread contact with the ground, as shown in Fig. 7, thus reducing the shearing friction of these wheels relatively to the ground and permitting them to be steered quite easily on the pivot bearings 18, 19. When the castering action is completed, the coil springs 35 act, through their pressure upon the wheel supporting links 25, to return the caster wheels into full contact with the ground as shown in Fig. 5, so that the load on these wheels is then supported by the full width of the wheel treads.

I now believe it to be clear that my invention greatly facilitates the proper alignment of caster wheels relatively to their castering axis, and that when my novel construction is embodied in a truck as shown in Figs. 1 and 2, I make it possible to steer the truck very easily at any desired angle without stalling the truck or in any way straining the parts thereof. It is believed that the very considerable value of my contribution will now be fully appreciated.

I now claim:

1. In a truck of the class described, a steering and driving wheel, a caster base, pivot means mounting said caster base on the truck to rotate on a caster axis, an axle, means mounting one end of said axle for upward and downward movement relatively to the caster base, means mounting the opposed end of the axle for upward and downward movement relatively to the caster base, bearing surfaces through which each axle end pivots on its mounting means whereby to move upwardly and downwardly independently of the other axle end, and a caster wheel rotating on said axle in contact with the ground and adapted to lean relatively to the ground through movement of the axle ends on their mounting means whereby to facilitate truck movement when the truck is steered by the steering and driving wheel.

2. In a truck of the class described having a steering and driving wheel, a caster base, a caster wheel in frictional engagement with the ground, an axle through which the caster wheel is mounted on the caster base, and pivot means mounting the caster base on the truck and steering the caster wheel as the steering and driving wheel moves the truck, the improvement that comprises a pair of links pivoted at one end to the caster base for movement independently of one another upwardly and downwardly relatively to said base, means mounting opposed ends of said axle on said links whereby the axle tilts as said links move relatively to one another, said caster wheel leaning to reduce its frictional engagement with the ground through tilting of the axle under the influence of the steering action of the pivot means, and individual springs acting between said caster base and said links to press the caster wheel against the ground whereby to support the truck in all positions of the caster wheel.

3. In a truck of the class described, a truck frame, a steering and driving wheel mounted for steering rotation on the truck frame, a caster base, pivot means mounting said caster base to rotate on a caster axis relatively to said frame, an axle, means mounting opposed ends of said axle for upward and downward movement independently of one another relatively to the truck frame while supporting the axle for rotation with the caster base, a caster wheel mounted to rotate on said axle in contact with the ground, said caster wheel leaning through movement of the axle ends relatively to each other due to pressure applied in a transverse direction to the caster wheel when the steering and driving wheel steers the truck, and said caster wheel by leaning reducing its frictional contact with the ground whereby to facilitate the movement of the truck.

4. In a truck of the class described having a frame, a steering and driving wheel on the frame in one corner of the truck at one end thereof, a caster wheel on the frame in the other corner of the truck at the said end thereof, said caster wheel mounted through pivot means for steering rotation relatively to the truck frame, bearing means on which the caster wheel rotates in contact with the ground, non-steering wheels at the two remaining corners at the other end of the truck, and said steering and driving wheel when changing the direction of truck movement effecting transverse pressure on the caster wheel with the caster wheel then opposing by its frictional engagement with the ground the movement of the truck, the improvement that comprises means mounting said bearing means for tilting movement relatively to the truck frame whereby the caster wheel can lean, yielding means opposing the tilting of said bearing means for holding the caster wheel in full contact with the ground, and said yielding means formed to yield when the steering and driving wheel effects transverse pressure on the caster wheel with said caster wheel then leaning to reduce its frictional contact with the ground whereby to facilitate truck movement.

References Cited in the file of this patent

UNITED STATES PATENTS

| | | |
|---|---|---|
| 632,166 | Berninghaus et al. | Aug. 29, 1899 |
| 1,622,447 | Kalberer | Mar. 29, 1927 |
| 1,891,517 | Williams | Dec. 20, 1932 |
| 2,272,270 | Krotz | Feb. 20, 1942 |
| 2,469,152 | Brown | May 3, 1949 |
| 2,564,002 | Gibson | Aug. 14, 1951 |
| 2,564,996 | Rasbach | Aug. 21, 1951 |
| 2,669,448 | Cushman | Feb. 16, 1954 |